(12) United States Patent
Dimitracopoulos et al.

(10) Patent No.: US 12,369,523 B2
(45) Date of Patent: Jul. 29, 2025

(54) CUTTING BLADE

(71) Applicants: Lambros Dimitracopoulos, Springvale (AU); Elias Dimitrakopoulos, Springvale (AU)

(72) Inventors: Lambros Dimitracopoulos, Springvale (AU); Elias Dimitrakopoulos, Springvale (AU)

( * ) Notice: Subject to any disclaimer, the term of this patent is extended or adjusted under 35 U.S.C. 154(b) by 1054 days.

(21) Appl. No.: 17/046,791

(22) PCT Filed: Apr. 8, 2019

(86) PCT No.: PCT/AU2019/000044
§ 371 (c)(1),
(2) Date: Oct. 11, 2020

(87) PCT Pub. No.: WO2019/195875
PCT Pub. Date: Oct. 17, 2019

(65) Prior Publication Data
US 2021/0153430 A1 May 27, 2021

(30) Foreign Application Priority Data
Apr. 11, 2018 (AU) ................................ 2018901207

(51) Int. Cl.
*A01D 34/73* (2006.01)
*A01D 34/66* (2006.01)

(52) U.S. Cl.
CPC ............. *A01D 34/73* (2013.01); *A01D 34/66* (2013.01)

(58) Field of Classification Search
CPC ........ A01D 34/63; A01D 34/64; A01D 34/66; A01D 34/73

USPC ............................................ 30/347, 299–305
See application file for complete search history.

(56) References Cited

U.S. PATENT DOCUMENTS

| | | | |
|---|---|---|---|
| 2,571,455 A | 10/1951 | Keiper | |
| 2,936,564 A | 5/1960 | Berry | |
| 3,162,990 A * | 12/1964 | Cook | A01D 34/68 |
| 3,183,655 A * | 5/1965 | Kern | A01D 34/73 |
| | | | 56/255 |
| 3,780,509 A | 12/1973 | Woelffer | |
| 4,651,510 A * | 3/1987 | Malutich | A01D 34/733 |
| | | | D15/17 |
| 4,686,819 A * | 8/1987 | Bryant | A01D 34/733 |
| | | | 30/337 |
| 4,977,735 A * | 12/1990 | Davis | A01D 34/73 |
| | | | 56/295 |

(Continued)

*Primary Examiner* — Adam J Eiseman
*Assistant Examiner* — Richard D Crosby, Jr.
(74) *Attorney, Agent, or Firm* — Edwin D. Schindler

(57) ABSTRACT

A cutting blade includes an elongate body portion mounted to a mowing or slashing machine having a left side and a right side. Both the left side and the right side have a leading edge and an opposing trailing edge with a downward portion provided on an outer end of the left side and the right side of the cutting blade. The downward portions having at least one cutting portion and which on the left side of the cutting blade, one or more cutting portions are provided on an inner side of the downward portion, and on the right side of the cutting blade, the one or more cutting portion are provided on an outer side of the downward portion. The improved cutting blade preferably has a horizontal body portion with staggered cutting portions.

16 Claims, 7 Drawing Sheets

(56) References Cited

U.S. PATENT DOCUMENTS

| | | | | |
|---|---|---|---|---|
| 4,995,228 A * | 2/1991 | Hladik, Jr. | A01D 34/73 | 56/DIG. 17 |
| 5,018,347 A * | 5/1991 | Feilen | A01D 34/733 | 30/337 |
| 5,094,065 A * | 3/1992 | Azbell | A01D 34/73 | 56/255 |
| 5,199,251 A * | 4/1993 | Rouse | A01D 34/73 | 56/255 |
| D357,691 S * | 4/1995 | Bryant | D15/17 | |
| 2,706,441 A | 4/1995 | Caldwell et al. | | |
| 5,890,354 A * | 4/1999 | Bednar | A01D 34/005 | 56/DIG. 17 |
| 6,182,430 B1 * | 2/2001 | Blarek | A01D 34/73 | 56/DIG. 17 |
| 6,301,868 B1 * | 10/2001 | Siplinger | A01D 34/73 | 56/255 |
| 6,415,591 B1 * | 7/2002 | Tylka, Sr. | A01D 34/73 | 56/255 |
| 6,487,840 B1 * | 12/2002 | Turner | A01D 34/73 | 56/295 |
| 6,655,119 B2 * | 12/2003 | Hasei | A01D 34/826 | 56/DIG. 17 |
| 7,617,664 B1 * | 11/2009 | Fitzpatrick | A01D 34/73 | 56/DIG. 17 |
| D755,858 S * | 5/2016 | Brown | D15/17 | |
| 10,285,328 B2 * | 5/2019 | Kurioka | A01D 34/68 | |
| 10,440,885 B2 * | 10/2019 | Shiotsuki | A01D 34/73 | |
| D873,302 S * | 1/2020 | Southwell | D15/17 | |
| D911,395 S * | 2/2021 | Dimitracopoulos | D15/17 | |
| 11,641,795 B2 * | 5/2023 | Xu | A01D 34/733 | 56/17.5 |
| 2015/0052868 A1 * | 2/2015 | Schreiner | A01D 34/66 | 56/289 |
| 2015/0082763 A1 * | 3/2015 | Nishihara | A01D 34/005 | 56/289 |
| 2020/0367430 A1 * | 11/2020 | Ito | A01D 34/73 | |
| 2021/0105937 A1 * | 4/2021 | Feng | A01D 34/73 | |
| 2021/0289697 A1 * | 9/2021 | Kurihara | A01D 34/826 | |
| 2022/0369548 A1 * | 11/2022 | Cheetham | A01D 34/73 | |

* cited by examiner

CUTTING BLADE

FIELD OF THE INVENTION

The present invention relates to an improved cutting blade. In particular, but not exclusively, the present invention relates to an improved cutting blade for mowers.

BACKGROUND TO THE INVENTION

Conventional cutting blades for lawn mowers comprise an elongated metal plate substantially rectangular in shape which is centrally mounted to the underside of the mower. Provided along a leading edge is a cutting portion. The trailing edge is provided with a bend or twist which is designed to generate airflow used to draw grass upward into the path of the cutting edge and to expel cut grass from the cutting area.

Since the introduction of rotary lawnmowers, various improvements have been made in the grass cutting blades utilised. The improvements, however, have been concentrated on the provision of mulching of the grass and improved expulsion of the grass clippings out from the lawnmower. However, to the best of Applicants' knowledge, no blades for use with rotary lawnmowers have been designed specifically for cutting long and/or thick grass and scrub/shrub and flora.

For example, U.S. Pat. No. 4,977,735 discloses a lawn sculpturing blade for use with a rotary lawn mower and the method of utilising the sculpturing blade to provide a sculptured effect to a lawn. A portion of the cutting edge is downwardly offset from the remainder of the cutting edge. The L-shaped downwardly offset portions are located between two "normal" height cutting edges and are formed by slits cut in the lateral direction across the blade from the leading edge into a mid-portion thereof. Two such slits are cut into the blade and the portion of the blade defined therebetween is bent downwardly into an L-shaped downwardly offset section. According to some embodiments, the downwardly offset portions are located at the distal ends of the blade in such a manner that the remainder of the "cutting portions" of the blade are blocked (blunted) so they no longer perform a significant cutting function. This patent discloses downwardly offset cutting blade portions. However, the downwardly offset cutting blade portions are solely designed for the purpose of providing a sculptured effect for a lawn. The lawn sculpturing blade is limited to being used with grass of a particular length and thickness.

U.S. Pat. No. 2,706,441 discloses a cutting attaching device for the rotary blade of a stalk or brush cutting machine. The device comprises a sleeve having open ends so that the sleeve may be reversibly mounted upon a rotary blade, said sleeve having opposed cutting edges, generally vertical blades secured to said sleeve near its opposite ends, each generally vertical blade having opposed cutting edges, and means to hold the sleeve in place upon said blade. The vertical blades are designed to pick up stalks or brushes which are lying down and cut them into short lengths which will then fall onto the ground. Since the blades extend to the ground and may penetrate the ground or hills for a considerable distance, they also serve as a rotary harrow or digger to cultivate the ground. The cutting attaching device is designed to cut stalk and brush that is lying horizontally and therefore, it would not be suitable for cutting vertical lengths of grass particularly as the device is designed to be fitted over rotary blades used for such purpose.

U.S. Pat. No. 2,936,564 discloses a blade unit for a rotary cutter which will effectively chop up all prunings or other cuttings in its path, regardless of the positioning of the cuttings relative to a horizontal plane. A vertical blade of a generally rectangular form is provided on each end which intersects with the horizontal blade. It projects an equal distance above and below the horizontal blade. The leading edge is sharpened with a bevel facing radially inward. The design is disclosed as cutting tree and vine prunings, stalks, brush and other debris of a similar nature lying on the ground, but is not disclosed as being utilised for cutting long grass and thick scrub/shrub and flora.

Existing lawn mower blades are restricted in the length and thickness of grass, shrub and/or flora they are able to cut. Where the lawn mower is unable to cut the grass it creates a carpet affect by folding the long blades of grass over as the lawn mower pass over. Existing cutting blades are unable to cut long grass and thick scrub and flora without the need to go back and forth or require multiple cuttings. Hence, there is a need for a cutting blade with improved cutting abilities which can operate with greater efficiency.

In this specification, the terms "comprises", "comprising" or similar terms are intended to mean a non-exclusive inclusion, such that an improved cutting blade that comprises a list of elements does not include those elements solely, but may well include other elements not listed.

OBJECT OF THE INVENTION

It is a preferred object of the present invention to provide an improved cutting blade for cutting long and/or thick grass, scrub/shrub and flora, that addresses or at least ameliorates one or more of the aforementioned problems of the prior art and/or provides consumers with a useful or commercial choice.

SUMMARY OF THE INVENTION

Generally, embodiments of the present invention relate to an improved cutting blade for cutting long and/or thick grass, scrub/shrub and flora.

According to one aspect, although not necessarily the broadest aspect, the present invention resides in an improved cutting blade comprising:
  an elongate body portion mountable via an aperture to a mowing and/or slashing machine having a left side and a right side, said left side and said right side having a leading edge and an opposing trailing edge;
  a downward portion provided on an outer end of the left side and the right side of the cutting blade, said downward portions having at least one cutting portion;
  wherein on the left side of the cutting blade, the cutting portion(s) are provided on an inner side of the downward portion and on the right side of the cutting blade, the cutting portion(s) are provided on an outer side of the downward portion.

Preferably, the leading edge on the right side is provided on the front of the cutting blade having a sharpened cutting portion angled downwardly toward the leading edge and the leading edge on the left side is provided on the rear of the cutting blade having a sharpened cutting portion angled upwardly toward the leading edge.

Preferably, the trailing edge is bent or twisted upwardly to provide a lift which generates airflow and creates a vortex motion used to draw grass clippings upward into the path of the cutting edge for cutting and expulsion of cut grass from the cutting area.

Preferably, the downward portion is offset at an angle relative to the body portion of the cutting blade which is effective for slicing.

Preferably, the downward portion is offset such that the angle between an underside of the cutting blade and an inner side of the downward portion is between 90° and 95°.

Preferably, the at least one cutting portion on the downward portion is in the form of a bevel which is sharpened.

Preferably, there are provided a pair of cutting portions which extend along a front edge and a bottom edge of the downward portion on the right side of the cutting blade and a rear edge and a bottom edge of the downward portion on the left side of the cutting blade.

Preferably, the cutting portions are staggered to create a similar cutting action to a saw, eliminating possible wedging into thick grass, shrubs/scrub and flora.

According to another aspect, although again not necessarily the broadest aspect, the present invention resides in an improved cutting blade comprising:
- a pair of cutting blades mountable via an aperture to a mowing and/or slashing machine including a left cutting blade and a right cutting blade, each having a leading edge and an opposing trailing edge;
- a downward portion provided on an outer end of the left blade and the right blade, said downward portions having at least one cutting portion;
- wherein on the left cutting blade, the cutting portion(s) are provided on an inner side of the downward portion and on the right cutting blade, the cutting portion(s) are provided on an outer side of the downward portion.

Further features and forms of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
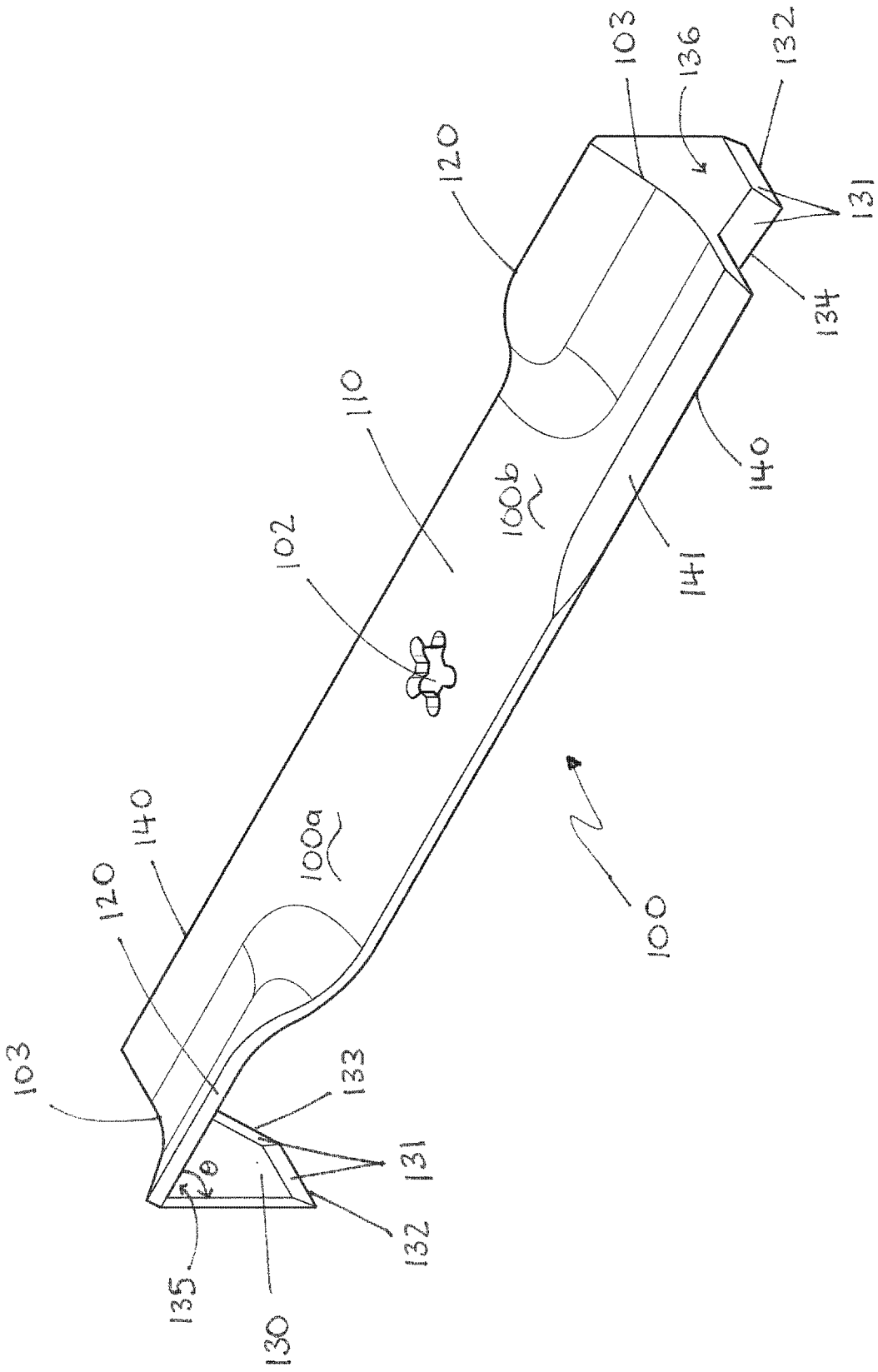
FIG. 1 shows a front perspective view from above of an improved cutting blade according to an embodiment of the present invention.
Figure 2:
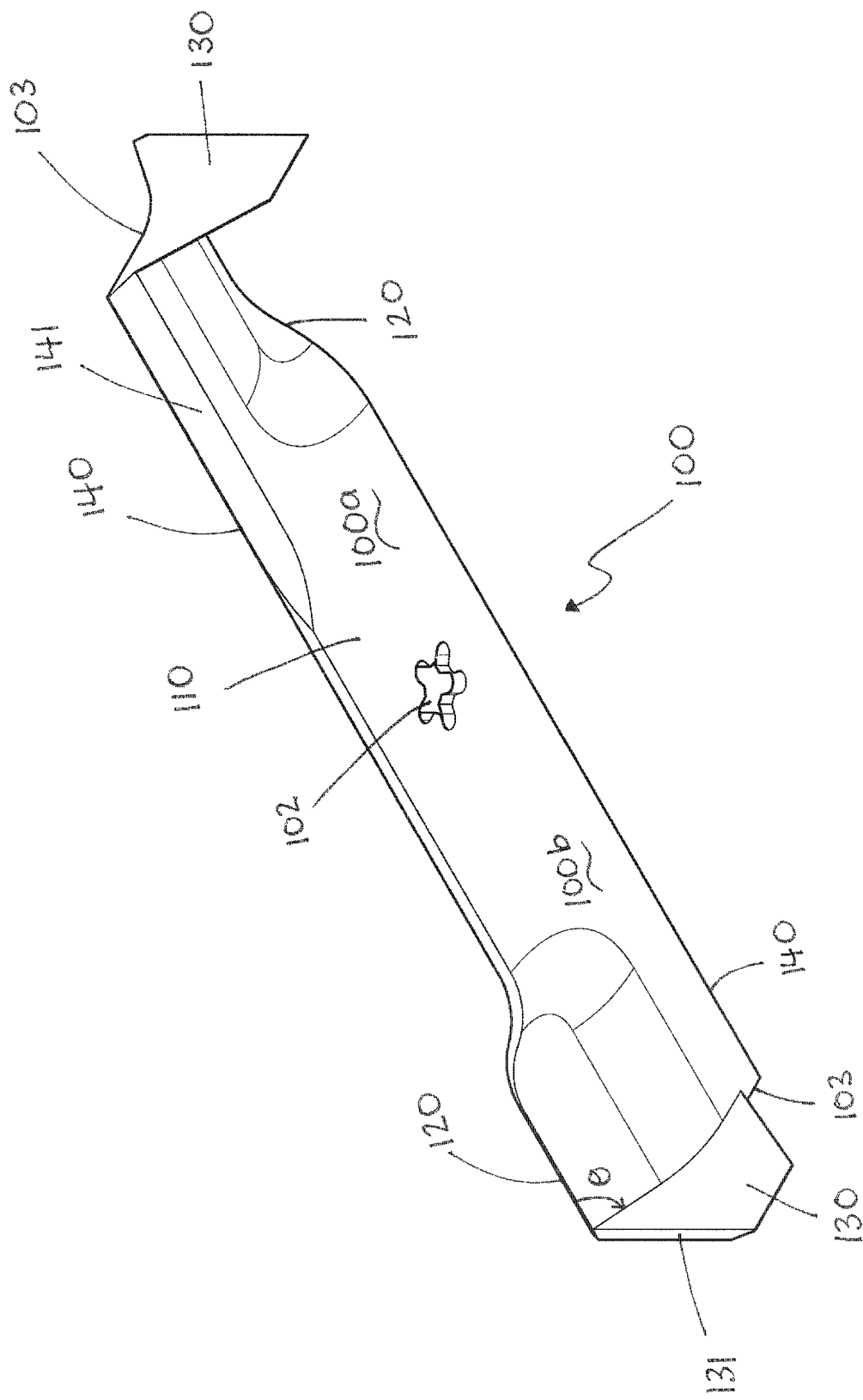
FIG. 2 shows a rear perspective view from below of the improved cutting blade of FIG. 1.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Embodiments of the present invention will be described with reference to an improved cutting blade for mowers. For convenience sake, the present invention will be described herein for use with lawn mowers and/or slashers. However, it will be acknowledged that the invention can be used with and/or adapted to suit different types of mowers, slashers and/or any machinery that cuts grass, scrub, shrub and flora. The improved cutting blade of the present invention is designed for cutting long and/or thick grass, scrub/shrub and flora. It will be acknowledged that the materials, colour, size and dimensions of the improved cutting blade may be varied as desired.

Referring to FIGS. 1 to 4, the improved cutting blade 100, comprises an elongate body portion 110. The body portion 110 of the cutting blade 100 is mountable to a lawn mower and/or slasher machine. The improved cutting blade 100 is mountable to a mount or shaft or the like provided on an underside of a deck or chassis of the lawn mower and/or slasher machine in a conventional manner to turn therewith. The area beneath the deck or chassis of the mower/slasher surrounding the improved cutting blade will be referred to herein as a cutting area. In particular, the improved cutting blade 100 is designed to be used with a rotary type lawn mower/slasher having cutting elements which are rotated in a horizontal cutting plane for severing grass at a predetermined height above the ground. Provided in the centre of the cutting blade 100 is an aperture 102 to enable the cutting blade 100 to be mounted to a rotating source on the lawn mower and/or slasher. While the mounting aperture 102 has been illustrated herein as having a cogwheel type shape, it will be acknowledged that the aperture 102 should be suitably shaped to be received by a corresponding mounting portion on the lawn mower or slasher. Accordingly, it is envisaged that multiple versions of the cutting blade 100 can be provided having different mounting apertures 102 to suit different lawn mower and slasher machines.

Figure 9:
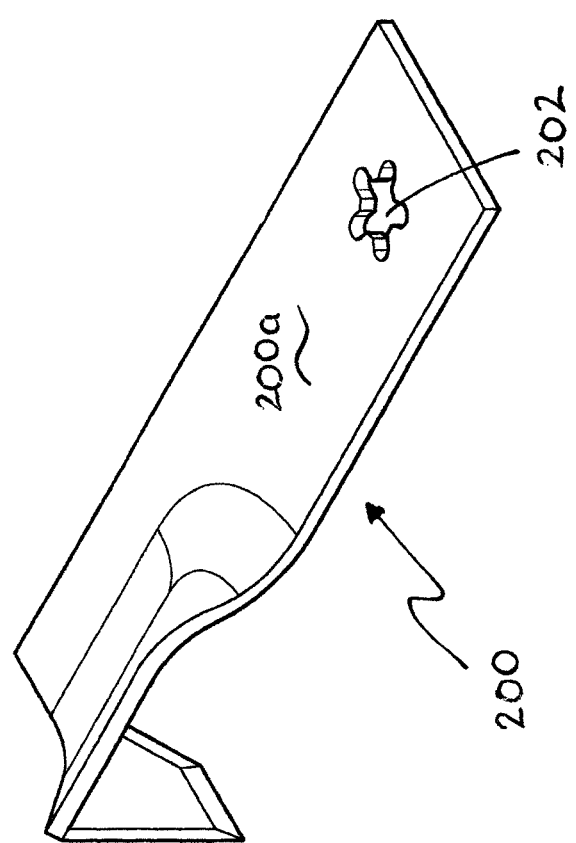
FIG. 9 shows a front perspective view from above of a left cutting blade according to an embodiment of the present invention.
Figure 10:
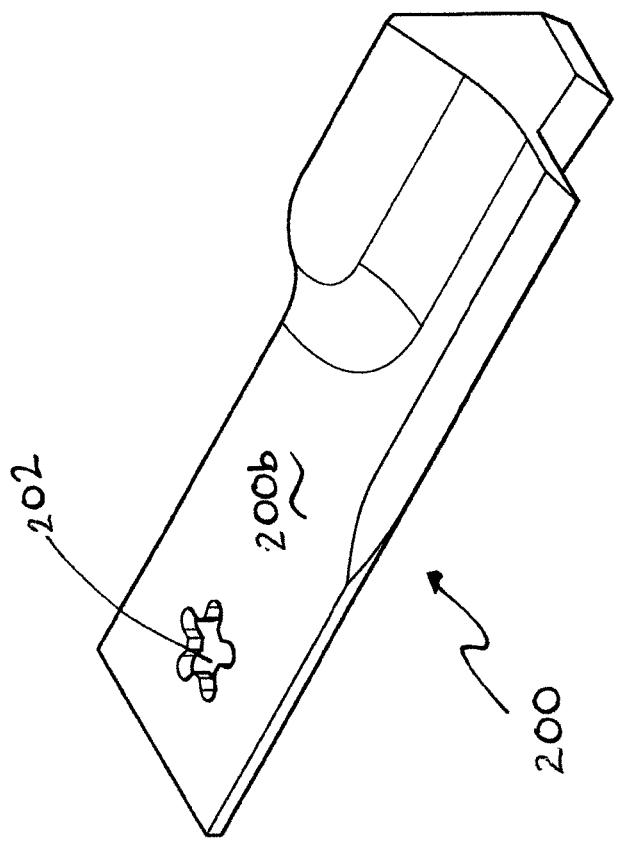
FIG. 10 shows a front perspective view from above of a right cutting blade according to an embodiment of the present invention.

The cutting blade 100 is substantially rectangular having provided two sides, which will be referred to hereinafter as, a left side 100*a* and a right side 100*b*. In an alternate embodiment of the present invention, a pair of cutting blades may be provided such that, the left side and right sides may be provided as separate left and right cutting blades, as illustrated in FIGS. 9 and 10. In such an embodiment, it is envisaged the aperture 102 would be provided on an inner mounting end of both the right and the left cutting blades.

Figure 3:
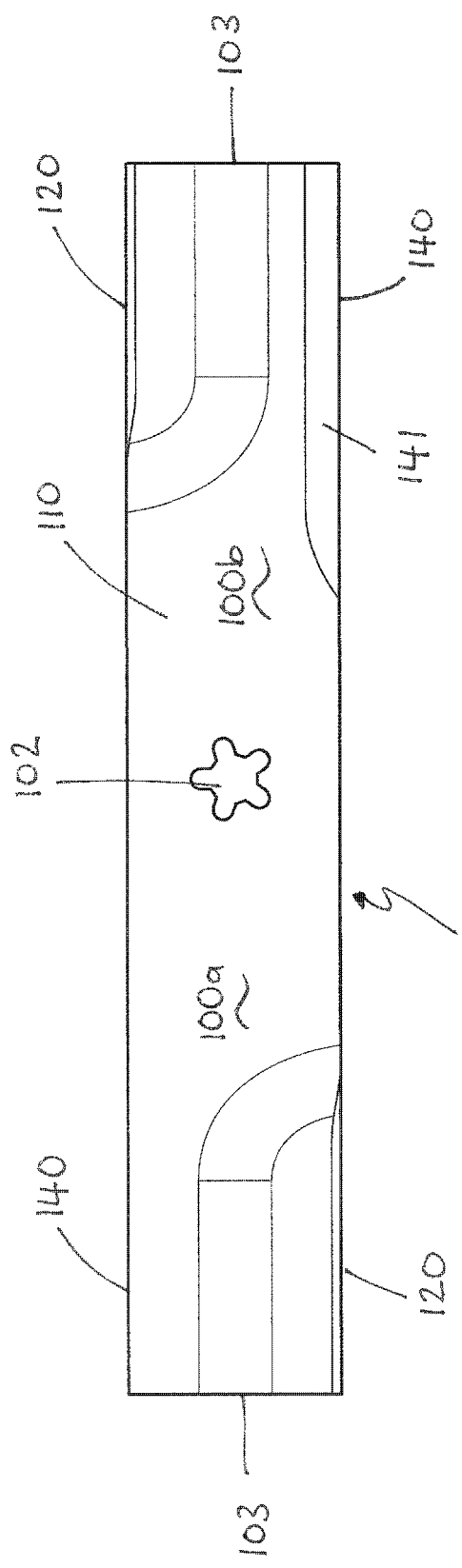
FIG. 3 shows a top view of the improved cutting blade of FIG. 1.
Figure 4:
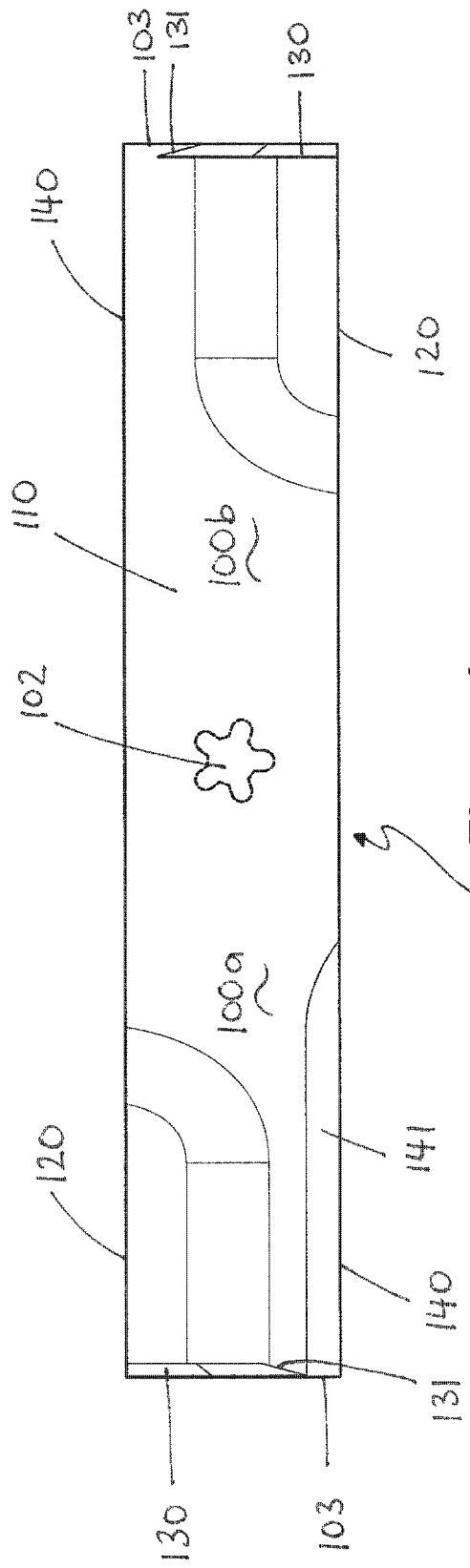
FIG. 4 shows a bottom view of the improved cutting blade of FIG. 1.
Figure 5:
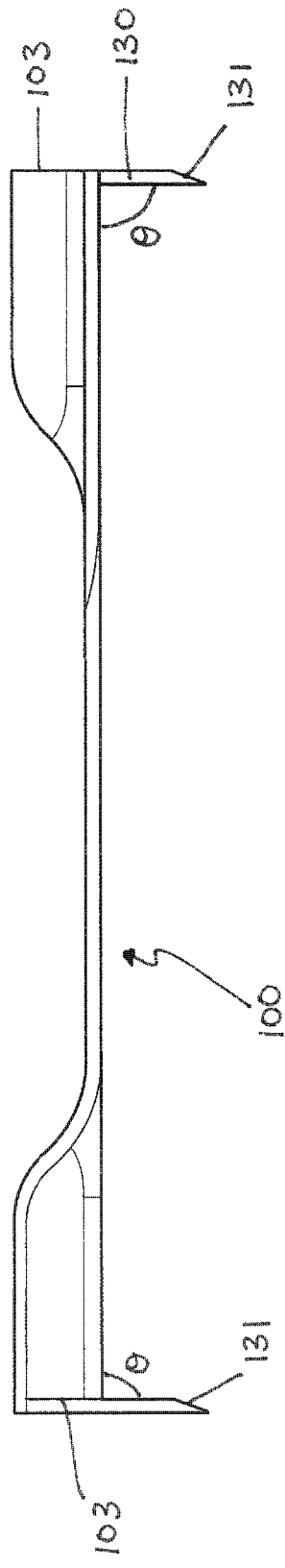
FIG. 5 shows a front view of the improved cutting blade of FIG. 1.
Figure 6:
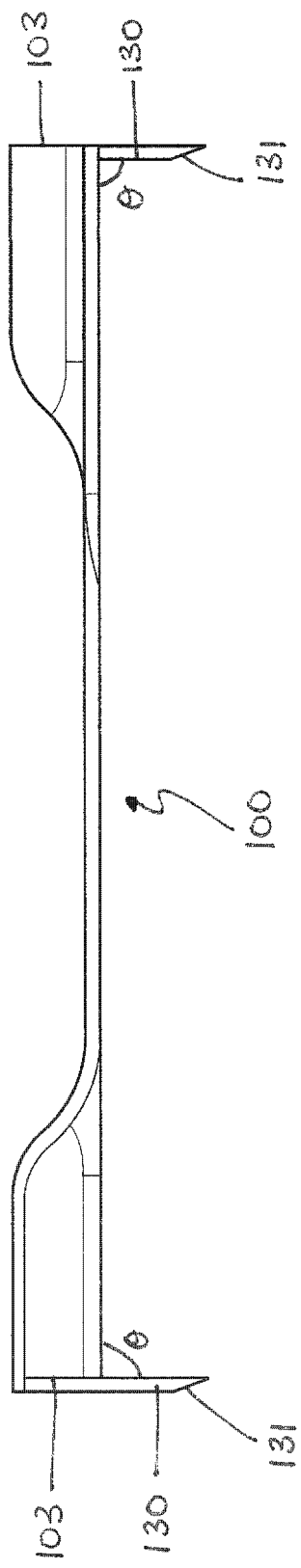
FIG. 6 shows a rear view of the improved cutting blade of FIG. 1
Figure 8:
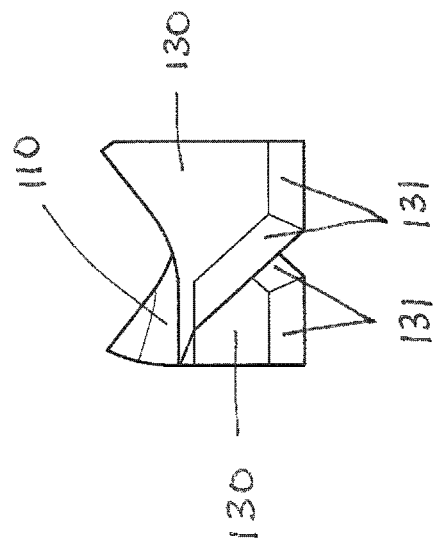
FIG. 8 shows a right side view of the improved cutting blade of FIG. 1.
Figure 7:
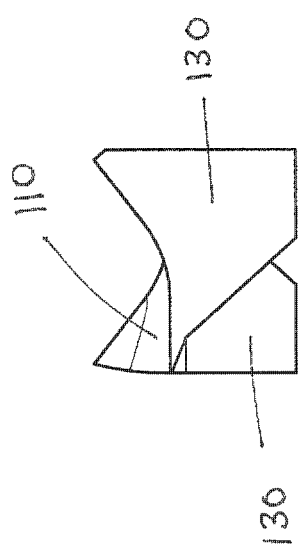
FIG. 7 shows a left side view of the improved cutting blade of FIG. 1.

Referring to FIGS. 1 to 4, each side of the cutting blade 100*a*, 100*b* has provided a leading edge 140 and a trailing edge 120. The leading edge 140 has a sharpened cutting portion 141. The cutting portion 141 is preferably bevelled from an inner surface of the cutting portion 141 to the leading edge. The cutting portion 141 on the right side 100*b* is provided on a top surface of the cutting blade 100, as shown in FIGS. 1 and 3. The cutting portion 141 on the right side 100*b* of the cutting blade is angled downwardly toward the leading edge 140. The cutting portion 141 on the left side 100*a* is provided on a bottom surface of the cutting blade 100, as shown on FIGS. 2 and 4. The cutting portion 141 on the left side 100*a* of the cutting blade is angled upwardly toward the leading edge 140. It will be acknowledged that the direction and angle of the bevel and positioning of the cutting portion 141 may be varied in alternate embodiments. The trailing edge 120 is preferably bent and/or twisted upwardly to provide a lift, which generates airflow and creates a vortex motion used to draw grass clippings upward into the path of the cutting edge for cutting and expulsion of cut grass from the cutting area.

Referring to FIGS. 1 to 8, the outer ends 103 of the cutting blade 100 are provided with a downward portion 130. According to an embodiment, the downward portion 130 is offset at an angle relative to the body portion 110 of the cutting blade 100, which is effective for slicing. The downward portion 130 is provided at an angle (shown as angle θ) which is capable of drawing air inwards and creating an air current within the cutting area that forces the grass, scrub and/or flora into the cutting the path of the cutting portions for cutting and expulsion of cut grass, scrub and/or flora from the cutting area. Preferably, the angle θ is between 90° to 95°. According to an embodiment illustrated herein, the downward portion 130 is offset such that the angle θ between an underside of the cutting blade 100 and an inner side 135 of the downward portion 130 is ninety-three degrees. It will be understood that the angle can be adjusted in alternate embodiments so long as the objectives of the invention are met. The downward portion 130 is provided with at least one cutting portion 131. The cutting portions 131 are in the form of a bevel as described above, which is sharpened and is designed to cut long grass, scrub and/or flora when it is pushed into a horizontal position as the mower/slasher passes over the long grass, scrub and/or flora.

According to an embodiment, it is envisaged that the cutting portion(s) 131 will be provided at a minimum of approximately 10 millimeters below the deck or chassis of the mowing machine being utilised. However, it will be acknowledged that the exact distance will be dependent on the domestic or commercial use of the mower. According to a preferred embodiment of the present invention illustrated herein, the downward portions 130 have provided two cutting portions 131 which extend along the two external edges of the downward portion 130 in the cutting direction of the cutting blade 100.

The cutting portions 131 are best depicted in FIG. 1 which shows a front perspective view of the cutting blade from above. As shown in FIG. 1, on the left side 100a of the cutting blade 100, the cutting portions 131 are provided on an inner side 135 of the downward portion 130. On the left side 100a of the cutting blade 100, one cutting portion 131 is provided along a bottom edge 132 of the downward portion and another cutting portion 131 is provided along a rear edge 133 of the downward portion 130. On the right side 110b of the cutting blade 100, the cutting portions 131 are provided on an outer side 136 of the downward portion 130. On the right side 100b of the cutting blade 100, one cutting portion 131 is provided along a bottom edge 132 of the downward portion and another cutting portion 131 is provided along a front edge 134 of the downward portion 130. The cutting portions 131 are preferably staggered to create a similar cutting action to a saw, eliminating possible wedging into thick shrubs/scrub.

In practice, the improved cutting blade 100 is mountable to a mount or shaft or the like provided on an underside of a deck or chassis of the lawn mower and/or slasher machine in a conventional manner to turn therewith. In operation, as the mower/slasher passes over the long grass, the long grass blade is pushed into a substantially horizontal position where the cutting portions 131 on the downward portion 130 will cut the long grass blade. As the mower/slasher moves forward, it repeatedly cuts the lengthy grass blade to leave behind finer cuttings. Once the grass blade is short enough to lie beneath the deck or chassis of the mower/slasher without being pushed over, the downward portion will no longer function and the cutting portions 141 provided on the leading edges 140 of the horizontal body portion 110 of the cutting blade 100 will function to cut the grass to a desired length. Once the downward portion 140 ceases its function, the cutting portions 141 on the body portion 110 perform their function by drawing the remaining grass into the path of the staggered cutting portions of the cutting blade 100, once again creating even finer cuttings.

Hence, the improved cutting blade of the present invention provides a solution to the aforementioned problems of the prior art by providing a cutting blade of the present invention is designed for cutting long grass and thick scrub/shrub and flora. Unlike existing blades, the present invention is capable of cutting large diameter stems and long blades of grass without merely folding the grass over. By having the ability to cut long grass efficiently with one forward motion, the present invention eliminates the need to go back and forth and/or mow multiple times.

The reference to any prior art in this specification is and should not be taken as, an acknowledgment or any form or suggestion that the prior art forms part of the common general knowledge in any country.

Throughout the specification the aim has been to describe the invention without limiting the invention to any one embodiment or specific collection of features. Persons skilled in the relevant art may realize variations from the specific embodiments that will nonetheless fall within the scope of the invention.

We claim:

1. An improved cutting blade comprising:
   an elongate body portion mountable via an aperture to a mowing or slashing machine having a left side and a right side, said left side and said right side having a leading edge with a sharpened cutting portion and an opposing trailing edge; and,
   a downward portion extending vertically downward from an outer side end of the left side and the right side of the elongate body portion of the cutting blade from the leading edge to the opposing trailing edge, and having a front edge, a rear edge and a bottom edge beneath the elongate body portion, said downward portion having at least one cutting portion provided along at least one of said front edge, said rear edge and said bottom edge;
   wherein on the left side of the cutting blade, the at least one cutting portion is provided on an inner side of the downward portion, and on the right side of the cutting blade, the at least one cutting portion is provided on an outer side of the downward portion for cutting grass, shrub and flora that has been pushed into a substantially horizontal position as the mowing or slashing machine passes thereover.

2. The improved cutting blade of claim 1, wherein the leading edge on the right side is provided on the front of the cutting blade having the sharpened cutting portion angled downwardly toward the leading edge and the leading edge on the left side is provided on the rear of the cutting blade having a sharpened cutting portion angled upwardly toward the leading edge.

3. The improved cutting blade of claim 1, wherein the trailing edge is bent or twisted upwardly to provide a lift which generates airflow and creates a vortex motion used to draw grass clippings upward into the path of the cutting edge for cutting and expulsion of cut grass from the cutting area.

4. The improved cutting blade of claim 1, wherein the downward portion is offset at an angle relative to the elongate body portion of the cutting blade which is effective for slicing.

5. The improved cutting blade of claim 1, wherein the downward portion is offset such that the angle between an underside of the cutting blade and an inner side of the downward portion is between 90° and 95°.

6. The improved cutting blade of claim 1, wherein the at least one cutting portion on the downward portion is in the form of a bevel which is sharpened.

7. The improved cutting blade of claim 1, wherein there are provided a pair of cutting portions which extend along a front edge and a bottom edge of the downward portion on the right side of the cutting blade and a rear edge and a bottom edge of the downward portion on the left side of the cutting blade.

8. The improved cutting blade of claim 1, wherein the cutting portions are staggered to create a similar cutting action to a saw, eliminating wedging into shrubs, scrub and flora.

9. An improved cutting blade comprising:
a body portion;
a pair of cutting blades mountable via an aperture provided on an inner mounting end of said pair of cutting blades to a mowing or slashing machine including a left-sided cutting blade and a right-sided cutting blade, each having a leading edge with a sharpened cutting portion and an opposing trailing edge, the aperture being used to align and mount the left-sided cutting blade and the right-sided cutting blade; and,
a downward portion extending along an outer side end of the left-sided cutting blade and the right-sided cutting blade from the leading edge to the opposing trailing edge, and having a front edge, a rear edge and a bottom edge beneath said body portion, said downward portion having at least one cutting portion provided at least one of said front edge, said rear edge and said bottom edge;
wherein on the left side cutting blade, the at least one cutting is provided on an inner side of the downward portion and on the right side of the cutting blade, the at least one cutting is provided on an outer side of the downward portion for cutting any grass, shrub or flora that has been pushed into a substantially horizontal position as the mowing or slashing machine passes thereover.

10. The improved cutting blade of claim 9, wherein the leading edge on the right cutting blade is provided on the front of the cutting blade having a sharpened cutting portion angled downwardly toward the leading edge and the leading edge on the left cutting blade is provided on the rear of the cutting blade having a sharpened cutting portion angled upwardly toward the leading edge.

11. The improved cutting blade of claim 9, wherein the trailing edge is bent or twisted upwardly to provide a lift which generates airflow and creates a vortex motion used to draw grass clippings upward into the path of the cutting edge for cutting and expulsion of cut grass from the cutting area.

12. The improved cutting blade of claim 9, wherein the downward portion is offset at an angle relative to the body portion of the cutting blade which is effective for slicing.

13. The improved cutting blade of claim 9, wherein the downward portion is offset such that the angle between an underside of the cutting blade and an inner side of the downward portion is between 90° and 95°.

14. The improved cutting blade of claim 9, wherein at least one cutting portion on the downward portion is in the form of a bevel which is sharpened.

15. The improved cutting blade of claim 9, wherein there are provided a pair of cutting portions which extend along a front edge and a bottom edge of the downward portion on the right cutting blade and a rear edge and a bottom edge of the downward portion on the left cutting blade.

16. The improved cutting blade of claim 9, wherein the cutting portions are staggered for eliminating possible wedging into thick shrubs, scrub and flora.

\* \* \* \* \*